(12) United States Patent
Liu et al.

(10) Patent No.: US 8,666,404 B2
(45) Date of Patent: Mar. 4, 2014

(54) METHOD AND APPARATUS FOR UNLOADING TERMINAL QUICKLY

(75) Inventors: Jingxiang Liu, Shenzhen (CN); Hui Zhang, Shenzhen (CN); Lei Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 434 days.

(21) Appl. No.: 12/735,898

(22) PCT Filed: Apr. 18, 2008

(86) PCT No.: PCT/CN2008/070753
§ 371 (c)(1),
(2), (4) Date: Aug. 23, 2010

(87) PCT Pub. No.: WO2009/105940
PCT Pub. Date: Sep. 3, 2009

(65) Prior Publication Data
US 2010/0330990 A1    Dec. 30, 2010

(30) Foreign Application Priority Data
Feb. 28, 2008 (CN) .......................... 2008 1 0101114

(51) Int. Cl.
*H04W 4/00* (2009.01)
(52) U.S. Cl.
USPC ..................... 455/435.1; 455/453; 370/310

(58) Field of Classification Search
USPC ................... 455/435.1, 453; 370/310
See application file for complete search history.

(56) References Cited

U.S. PATENT DOCUMENTS

| | | | |
|---|---|---|---|
| 2003/0153309 A1* | 8/2003 | Bjelland et al. ............... | 455/432 |
| 2006/0218279 A1* | 9/2006 | Yamaguchi et al. .......... | 709/226 |
| 2008/0107083 A1* | 5/2008 | Shirota et al. ................. | 370/331 |
| 2009/0209252 A1* | 8/2009 | Han et al. ...................... | 455/433 |

FOREIGN PATENT DOCUMENTS

| | | |
|---|---|---|
| CN | 101047900 A | 10/2007 |
| CN | 101060652 A | 10/2007 |
| CN | 101232648 A | 7/2008 |

* cited by examiner

Primary Examiner — Justin Lee
(74) Attorney, Agent, or Firm — Farjami & Farjami LLP

(57) ABSTRACT

A method and an apparatus for quickly unloading a terminal are provided. The method comprises: paging a user terminal which is registered in a mobile switch to unload through a wireless access node after the mobile switch to unload receives a command of unloading the user terminal; the mobile switch to unload detecting whether a paging acknowledgement returned from the user terminal is received, if yes, sending a message to notify that the user terminal is to be unloaded, and then releasing the current signaling connection with the user terminal.

15 Claims, 8 Drawing Sheets

METHOD AND APPARATUS FOR UNLOADING TERMINAL QUICKLY

This is a U.S. national phase application which is based on, and claims priority from, PCT application Serial No. PCT/CN2008/070753, filed Apr. 18, 2008, which claims priority from foreign application Serial No. 200810101114.X, filed Feb. 28, 2008, in China.

TECHNICAL FIELD

The present invention relates to the field of mobile communication, and in particular, to a method and apparatus for quickly unloading a terminal in a switch pool network.

BACKGROUND OF THE INVENTION

Switch pool is a means for network disaster tolerance in mobile communication and is composed of a plurality of mobile switches, and the mobile switches in a switch pool collectively provide communication services for the users in the corresponding areas.

FIG. 1 illustrates the structure of a switch pool network, wherein a wireless network controller 15 and a base station controller 13 serve as wireless access nodes and are connected with all of the mobile switches 12 in the switch pool, GSM (Global System for Mobile Communications) terminal 14 or a WCDMA (Wideband CDMA) terminal 16 communicates with the mobile switch 12 through the wireless access node, i.e., communicates with the mobile switch 12 through the wireless network controller 15 or the base station controller 13. when a user terminal enters an area covered by the switch pool, the wireless network controller 15 or the base station controller 13 can determine one mobile switch in the switch pool as a selected result according to the international mobile subscriber identity (IMSI) of the user terminal, and allocate the user terminal onto the mobile switch of the switch pool for service processing through an internal algorithm.

The mobile switch 12 allocates a temporary mobile subscriber identity (TMSI) for the user terminal, and the TMSI contains a network resource identity (NRI) field, which is uniquely directed to the mobile switch 12 in the switch pool. The TMSI containing NRI will be used in the services originated subsequently by the user in the switch pools, thus ensuring that all of the subsequent services are processed in the same mobile switch 12.

It can be see from FIG. 1 that the network also comprises a home location register 11. Serving as a storage node for the permanent data of the user terminal, and the home location register 11 has a signaling connection with each mobile switch 12 in the switch pool. Moreover, in the process of location update, the mobile switch 12 can download permanent data of the user terminal from the home location register 11.

When a mobile switch 12 needs maintenance, it transfers the registered user terminal to other mobile switches 12 in the switch pool and ensures load evenness, and the above process is called as load unloading.

The flow for a mobile switch in a switch pool to unload a user terminal in the prior art will be introduced below with reference to FIG. 1 and FIG. 2, which comprises the following steps in detail:

201, a maintaining and managing tool sending an unloading command to a mobile switch 12 and all of the wireless access nodes in the switch pool;

The mobile switch in this step is just the mobile switch that needs to unload the user terminal, and thus is called in short as a mobile switch to unload.

202, during a time period of T1, the mobile switch to unload receiving a location update request from the user terminal and accepting the request, sending a location update acknowledgement to the user terminal, and allocating a new TMSI to the user terminal, wherein NRI is null network resource identity (NULL-NRI), and notifying the user terminal that the current LAI (location area identity) is a Non-Broadcast LAI, wherein the above TMSI and LAI are contained in a location update acknowledgement message;

The user terminal periodically sends a location update request, and the mobile switch to unload has to wait for the user terminal to send out the request. Generally, the time of network periodical location update of a user terminal is 30 minutes to 2 hours, and in order to ensure that all user terminals under the mobile switch to unload can be transferred to other mobile switches of the switch pool, the time T1 in step 202 should be at least 2 times as the time of periodical location update of the user terminal, i.e., the duration of T1 is 1~4 hours.

Step 203, the user terminal receiving the location update acknowledgement, since the location area identity is a Non-Broadcast LAI, the user terminal immediately originating a location update request again; after the wireless access nodes in the switch pool receiving the new location update request, if the wireless access nodes determine that NRI thereof is NULL-NRI, then the wireless access nodes allocating the location update request to other mobile switches that are not in unloading condition;

Step 204, a new mobile switch accepting the location update, performing location update processing, and allocating TMSI for the user terminal, wherein the TMSI includes NRI of the new mobile switch; the mobile switch returning a location update acknowledgement to the user terminal, and sending the new TMSI to the user terminal;

Through steps 201~204, the user terminals of the mobile switch to be maintained are transferred to other mobile switches, the mobile switch to unload can temporarily stop working until maintenance is completed.

In the process of carrying out the present invention, it is found that the prior art at least has the following problems: after the maintaining and managing tool sends an unloading command to the mobile switch, it has to passively wait for a location update request returned from the user terminal; it takes 1~4 hours for all of the user terminals under the mobile switch to be completely unloaded and transferred to other mobile switches, thus causing the process of the unloading process to take too long time. Especially if the mobile switch has an emergent failure, too long unloading time will delay maintenance of the system, which causes part of users to be unable to receive services for a long time, thus reducing the degree of satisfaction of the customers.

SUMMARY OF THE INVENTION

The technical problem to be solved in the present invention is to provide a method and apparatus for quickly unloading a terminal to reduce the duration time for a mobile switch in a network to unload a user terminal, thus enabling the mobile switch to be maintained in time and ensuring the QoS of the system.

In order to solve the above problem, the present invention provides a method for quickly unloading a terminal, comprising:

paging a user terminal which is registered in a mobile switch to unload through a wireless access node after the mobile switch to unload receives a command of unloading the user terminal; and the mobile switch to unload detecting whether a paging acknowledgement returned from the user terminal is received, if yes, sending a message to notify that the user terminal is to be unloaded, and then releasing a current signaling connection with the user terminal.

Further, after the mobile switch to unload detects that the paging acknowledgement returned from the user terminal is received, the mobile switch to unload sends a temporary mobile subscriber identity (TMSI) reallocation command including a NULL-network Resource identity to the user terminal, and after the mobile switch to unload receives a TMSI reallocation completion message returned from the user terminal, the mobile switch to unload sends a releasing message to the wireless access node to release a current signaling connection with the user terminal.

Further, after the mobile switch to unload detects that the paging acknowledgement returned from the user terminal is received, the mobile switch to unload notifies the user terminal that a current location area identity is a Non-Broadcast Location Area Identity;

after release of the current signaling connection is completed, the user terminal located in a non-broadcast location area originates location update, and sends a location update request to a mobile switch which is not in unloading condition for processing; and the mobile switch which is not in unloading condition allocates a network resource identity to the user terminal.

Further, when paging a user terminal registered under the mobile switch to unload, the mobile switch to unload sends paging messages in batches during the unloading process according to load capability of the mobile switch to unload and/or a signaling link.

Further, when the mobile switch to unload does not receive a paging acknowledgement returned from the user terminal, the mobile switch to unload sends a searching command in a wireless area through the wireless access node, the user terminal returns a paging acknowledgement after receiving the searching command, and the mobile switch to unload releasing a current signaling connection with the user terminal.

Further, after an unloading process is started, the mobile switch to unload sends a network resource identity suspending message to the wireless access node; and after the unloading process is over, the mobile switch to unload sends a network resource identity restoring message to the wireless access node.

Further, in a case that a paged user terminal is powered off in a process of the mobile switch to unload paging the user terminal registered under the mobile switch to unload, the method further comprises:

after the user terminal is powered on, sending an initial user terminal message or an initial mobile station message containing a network resource identity of the mobile switch to unload; and when the network resource identity is suspended, the wireless access node allocating the initial user terminal message or the initial mobile station message to other mobile switches which are not in unloading condition.

Further, the wireless access node is a wireless network controller or a base station controller.

The present invention also provides a mobile switch comprising a paging module, a detecting module and a releasing module which are sequentially connected, wherein, the paging module is used for paging a user terminal registered under the mobile switch to unload after receiving a command of unloading a user terminal;

the detecting module is used for detecting whether a paging acknowledgement returned from the user terminal is received, if yes, sending a message to notify that the user terminal is to be unloaded;

the releasing module is used for releasing a current signaling connection with the user terminal.

Further, the detecting module is also used for sending a temporary mobile subscriber identity (TMSI) reallocation command including a NULL-network Resource identity to the user terminal after receiving a paging acknowledgement returned from the user terminal;

the releasing module is also used for sending a releasing message to the wireless access node to release a current signaling connection with the user terminal after receiving a TMSI reallocation completion message returned from the user terminal.

Further, the switch further comprises a searching module connected with the detecting module, wherein, the searching module is used for sending a command of searching the user terminal in a wireless area when the detecting module does not detect any paging acknowledgement.

Further, the switch further comprises a allocating module, wherein, the allocating module is used for allocating a network resource identity to the user terminal.

Further, the switch further comprises a network resource identity suspending module and a network resource identity restoring module;

the network resource identity suspending module is used for sending a network resource identity suspending message to the wireless access node after an unloading process is started;

the network resource identity restoring module is used for sending a network resource identity restoring message to the wireless access node after an unloading process is over.

One of the technical scheme of the above technical schemes has the following beneficial effects: effectively reducing duration time for a mobile switch to unload a user terminal, quickening progress of maintenance, thus protecting QoS of the network.

PREFERRED EMBODIMENTS OF THE INVENTION

In order that a person having ordinary skill in the art can better understand the technical scheme of the present invention, the examples of the present invention will be described below in further detail with reference to accompanying drawings and embodiments.

Figure 1:
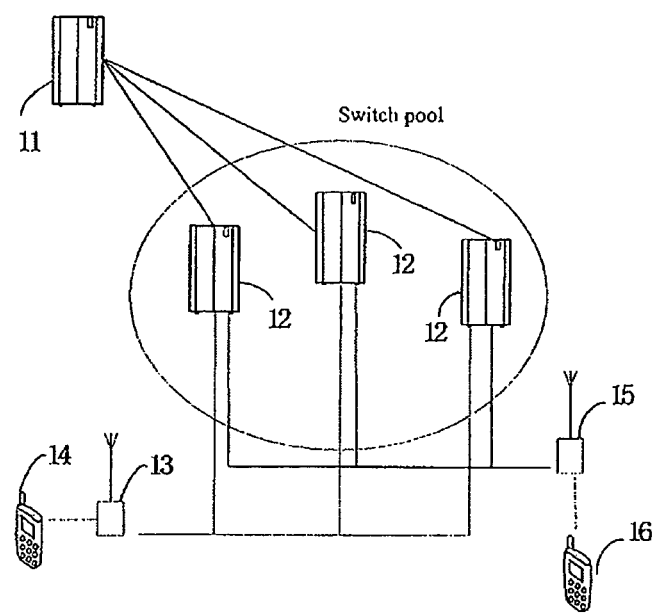
FIG. 1 illustrates the network structure of the switch pool according to the prior art.
Figure 2:
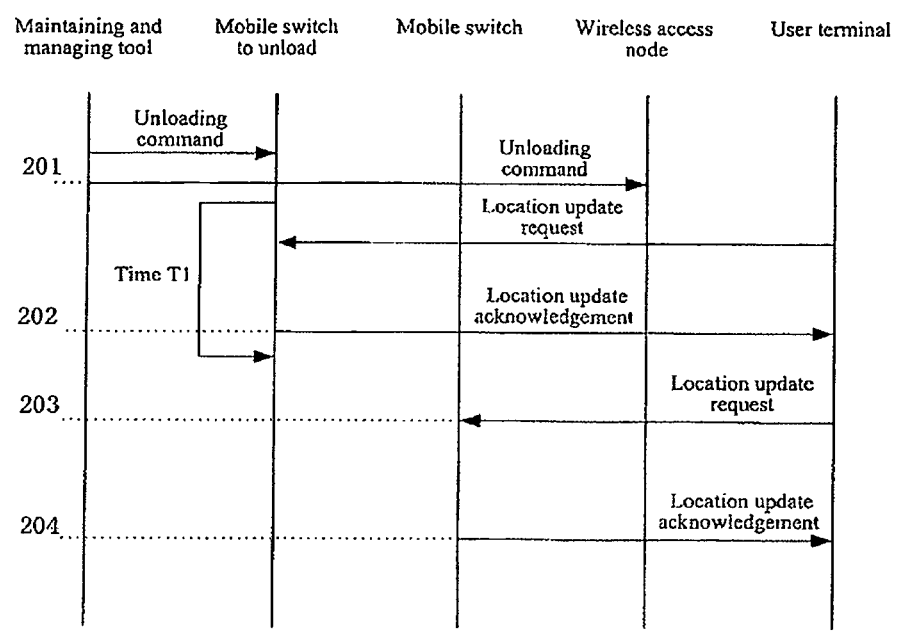
FIG. 2 is a flow for a mobile switch in the switch pool to unload a user terminal according to the prior art.
Figure 3:
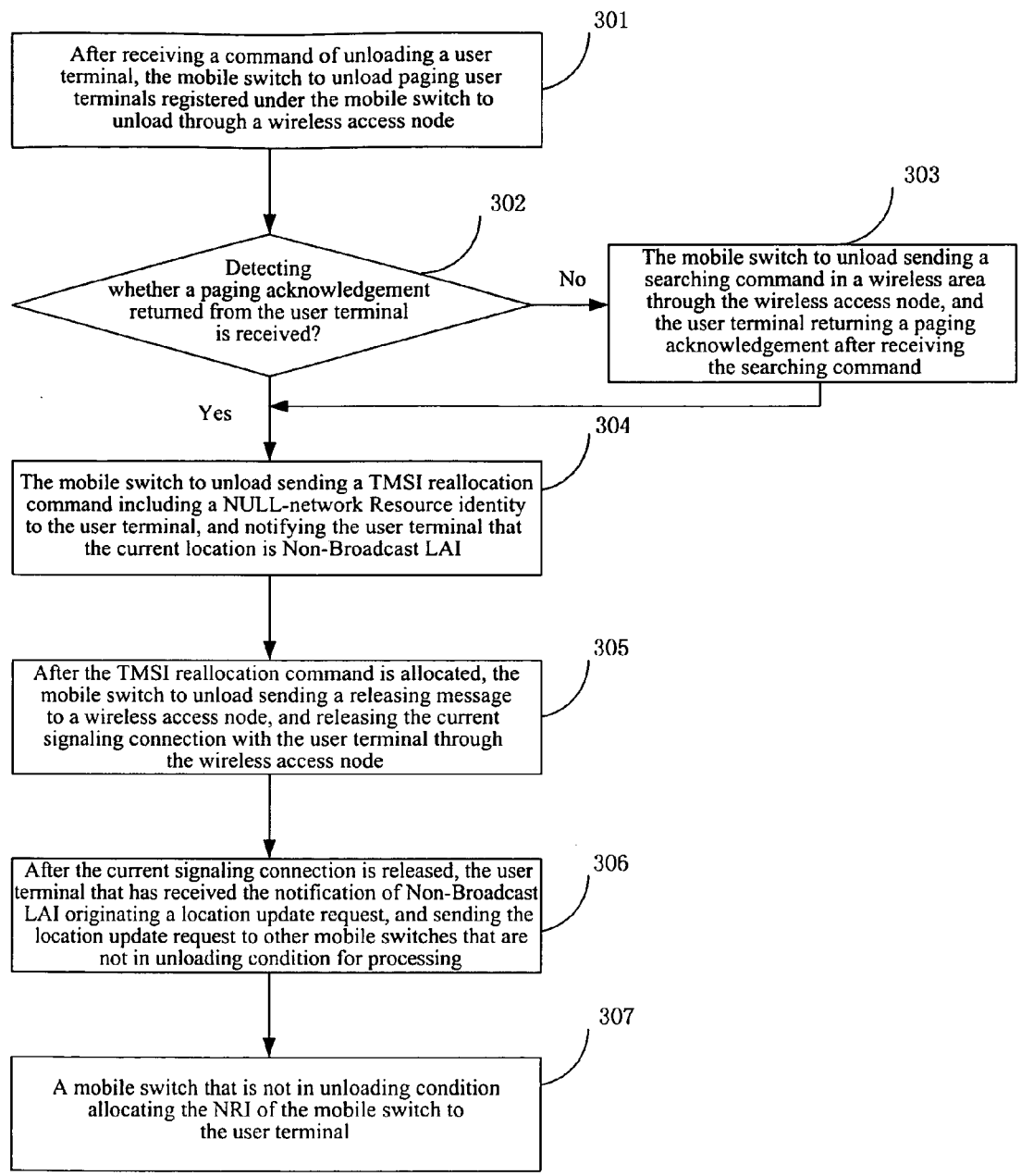
FIG. 3 is a flow of quickly unloading a user terminal according to one example of the present invention.

Refer to FIG. 3, it is a flow of unloading a user terminal by a mobile switch in a switch pool according to one example of the present invention, which specifically comprises the following steps:

Step 301, after receiving a command of unloading a user terminal, the mobile switch to unload paging user terminals registered under the mobile switch to unload through wireless access nodes;

wherein an unloading command is sent to the mobile switch to unload and all wireless access nodes in the switch pool through a maintaining and managing tool in the network, then all user terminals registered under the mobile switch to unload are paged through the wireless access nodes, active paging of the mobile switch to unload shortens the time for information communication with the user terminal.

Step 302, detecting whether a paging acknowledgement returned from the user terminal is received, if yes, executing step 304, otherwise executing step 303;

wherein the mobile switch to unload can set a time threshold (for example, 18 seconds), and it is detected whether a paging acknowledgement returned from the user terminal is received within the time threshold, if yes, executing step 304, otherwise executing step 303.

Step 303, the mobile switch to unload sending a searching command in a wireless area through the wireless access nodes, and the user terminal returning a paging acknowledgement after receiving the searching command, then executing step 304.

If the user terminal does not send a paging acknowledgement, then the mobile switch to unload may sending a searching command in all wireless areas in the switch pool, and the user terminal returns a paging acknowledgement after receiving the searching command.

In this step, paging messages can be sent in batches during an unloading process of a mobile switch to unload according to load capability of the mobile switch to unload and/or a signaling link.

Step 304, the mobile switch to unload sending a temporary mobile subscriber identity (TMSI) reallocation command including a NULL-network Resource identity to the user terminal, and notifying the user terminal that the current location is Non-Broadcast LAI; then executing step 305;

after the user terminal returns a paging acknowledgement, the mobile switch to unload sending a TMSI reallocation command to the user terminal, wherein the carried TMSI includes a NULL-network Resource identity, and the current location area identity of the user terminal is a Non-Broadcast LAI.

Step 305, after the TMSI reallocation command is distributed, the mobile switch to unload sending a releasing message to wireless access nodes, and releasing the current signaling connection with the user terminal through the wireless access nodes;

Through the above steps 301~305, unloading of the user terminal in the mobile switch to unload has been achieved, but in order to ensure normal use of the user terminal, the above method may further comprises the following steps:

Step 306, after the current signaling connection is released, the user terminal that has received the notification of Non-Broadcast LAI originating a location update request, and sending the location update request to other mobile switches that are not in unloading condition for processing; then executing step 307;

After the current signaling connection is released, the wireless access nodes notify the user terminal that the connection has been released. Since the location area identity is a Non-Broadcast LAI, the user terminal re-originates a location update immediately after the current signaling connection is released. After the wireless access nodes in the switch pool receives a new location update request, since NRI is a Null NRI and there is a mobile switch demanding unloading, the location update request is allocated to other mobile switches that are not in unloading condition for processing;

Step 307, a mobile switch that is not in unloading condition allocating the NRI of the mobile switch to the user terminal.

The mobile switch that is not in unloading condition performs location update processing, and returns a location update acknowledgement, allocates a new TMSI for the user terminal, wherein the new TMSI includes NRI of the mobile switch, and the subsequent processings of the user terminal are all performed in the mobile switch that is not in unloading condition through the NRI, thus achieving quick unloading a user terminal of a mobile switch.

The method for unloading a terminal according to the examples of the present invention will be introduced below based on a WCDMA use terminal a GSM user terminal respectively.

Figure 4:
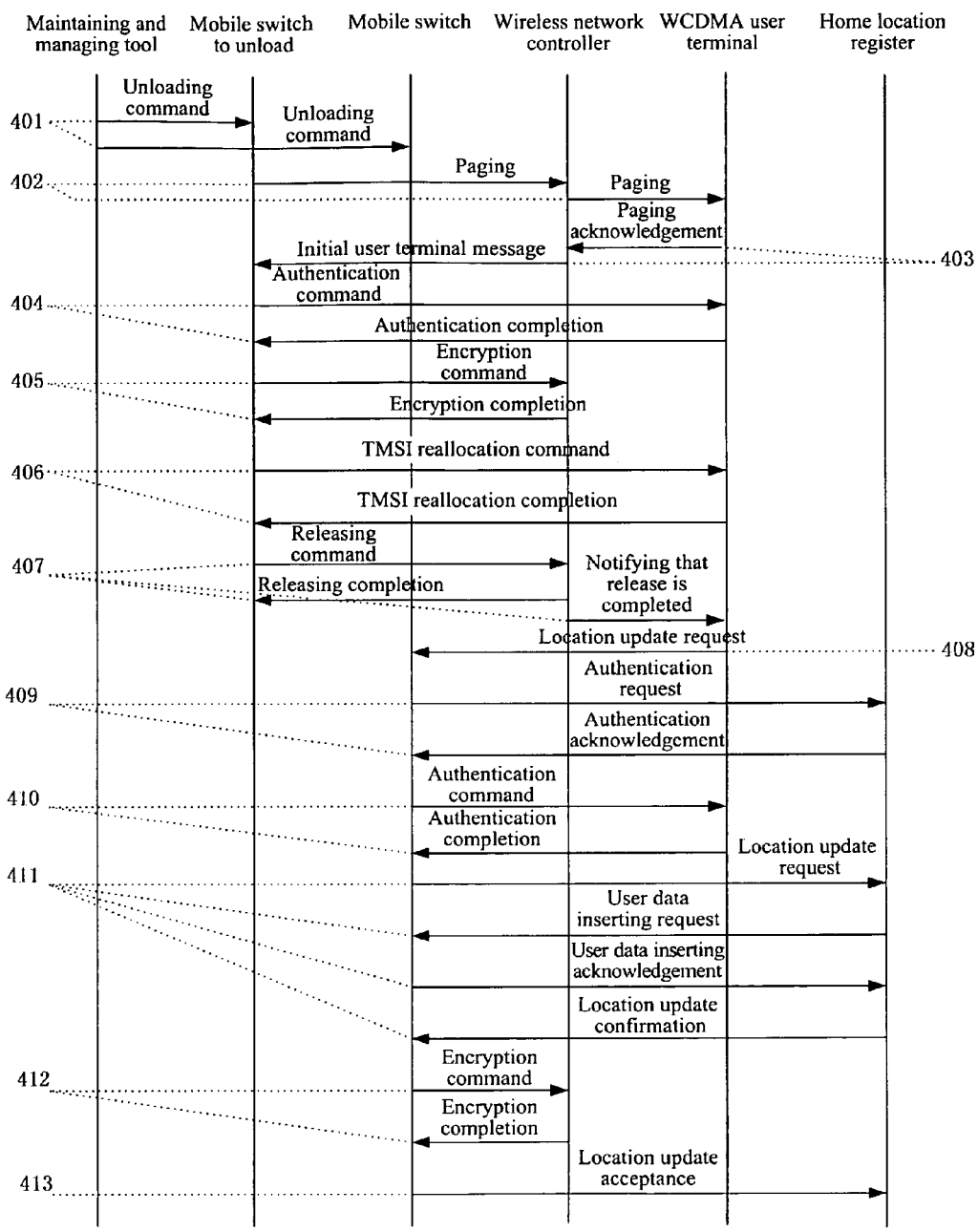
FIG. 4 is a flow of quickly unloading a WCDMA user terminal according to one example of the present invention.

As shown in FIG. 4, it is a flow of quickly unloading a WCDMA user terminal according to one example of the present invention. It can be seen from the flow that after receiving a command of unloading a user terminal, a mobile switch to unload originates a paging for a WCDMA user terminal registered under the mobile switch, allocates a new TMSI for the user terminal after paging, fills the Non-Broadcast LAI in a TMSI reallocation message, and the mobile switch to unload requires the user terminal to re-originate location update immediately. Since the newly distributed TMSI includes a Null-NRI, the user terminal is allocated into other mobile switches that are not in unloading condition in the process of location update. The specific steps are as follows:

Step 401, a maintaining and managing tool sending an unloading command to a mobile switch to unload and wireless network controllers to notify all wireless network controllers in the switch pool that the mobile switch starts unloading;

Step 402, the mobile switch to unload sending a paging message to the wireless network controllers, and paging all WCDMA user terminals registered under this mobile switch through the wireless network controllers;

In this example, paging messages can be sent in batches for a plurality of times during an unloading process of the mobile switch to unload according to load capability of the mobile switch to unload and a signaling link.

Step 403, a WCDMA user terminal acknowledging the paging, a paging acknowledgement being packed as an initial user terminal message in the wireless network controller and sent to the mobile switch to unload;

In this example, if the WCDMA user terminal does not acknowledge the paging, then the mobile switch to unload may sending a searching command in all wireless areas in the switch pool, and the user terminal returns a paging acknowledgement after receiving the searching command.

Step 404, the mobile switch to unload performing authentication for the WCDMA user terminal, sending an authentication command to the WCDMA user terminal, and the WCDMA user returning an authentication acknowledgement;

Step 405, the mobile switch to unload continues to perform encryption, and sending an encryption command to the wireless network controller, the wireless network controller performing wireless side encryption and returning an encryption completion message;

Step 406, the mobile switch to unload sending a TMSI reallocation command to the WCDMA user terminal, wherein the command carries TMSI and LAI. The NRI included in the TMSI is Null-NRI, and the LAI is Non-Broadcast LAI. The WCDMA user terminal returning a TMSI reallocation completion message;

Step 407, the mobile switch to unload sending a releasing command to the wireless network controller to release the current signaling connection. The wireless network controller releasing the signaling connection to the WCDMA user terminal and returning a release completion message; the wireless network controller also notifying the WCDMA user terminal that the signaling connection has been released;

Step 408, after receiving a TMSI reallocation message, the WCDMA user terminal originating location update after the current signaling connection is released since LAI is Non-Broadcast LAI, sending a location update request to the wireless network controller, wherein the request carries the above TMSI. After the wireless network controller receives the location update request, the wireless network controller allocating the location update request to other mobile switches that are not in unloading condition for processing since NRI is Null-NRI;

Step 409, the mobile switch that has received location update processing the location update request. Since the WCDMA user terminal is registered at the mobile switch for the first time, the mobile switch sending an authentication request to a home location register, and the home location register returning authentication information of the user in an authentication acknowledgement message;

Step 410, the mobile switch performing authentication for the WCDMA user terminal, sending an authentication command to the WCDMA user terminal, and the WCDMA user terminal returning an authentication completion message;

Step 411, the mobile switch sending a location update request to the home location register, the home location register downloading user data and sending a user data inserting request. The mobile switch storing the user data and returning a user data inserting acknowledgement, and the home location register returning a location update confirmation;

Step 412, the mobile switch sending an encryption command to the wireless network controller, and the wireless network controller performing wireless encryption and returning an encryption completion message;

Step 413, the mobile switch sending a location update acceptance to the WCDMA user terminal, wherein the TMSI field includes NRI of the mobile switch. Therefore, the user terminal is transferred to a new mobile switch. When all WCDMA user terminals under the mobile switch to unload are transferred, the process of unloading by a mobile switch is completed.

The above introduces how to unload a WCDMA user terminal, and if the wireless network controller is changed to a base station controller, the example of the present invention also applies to unloading a GSM user terminal.

Figure 5:
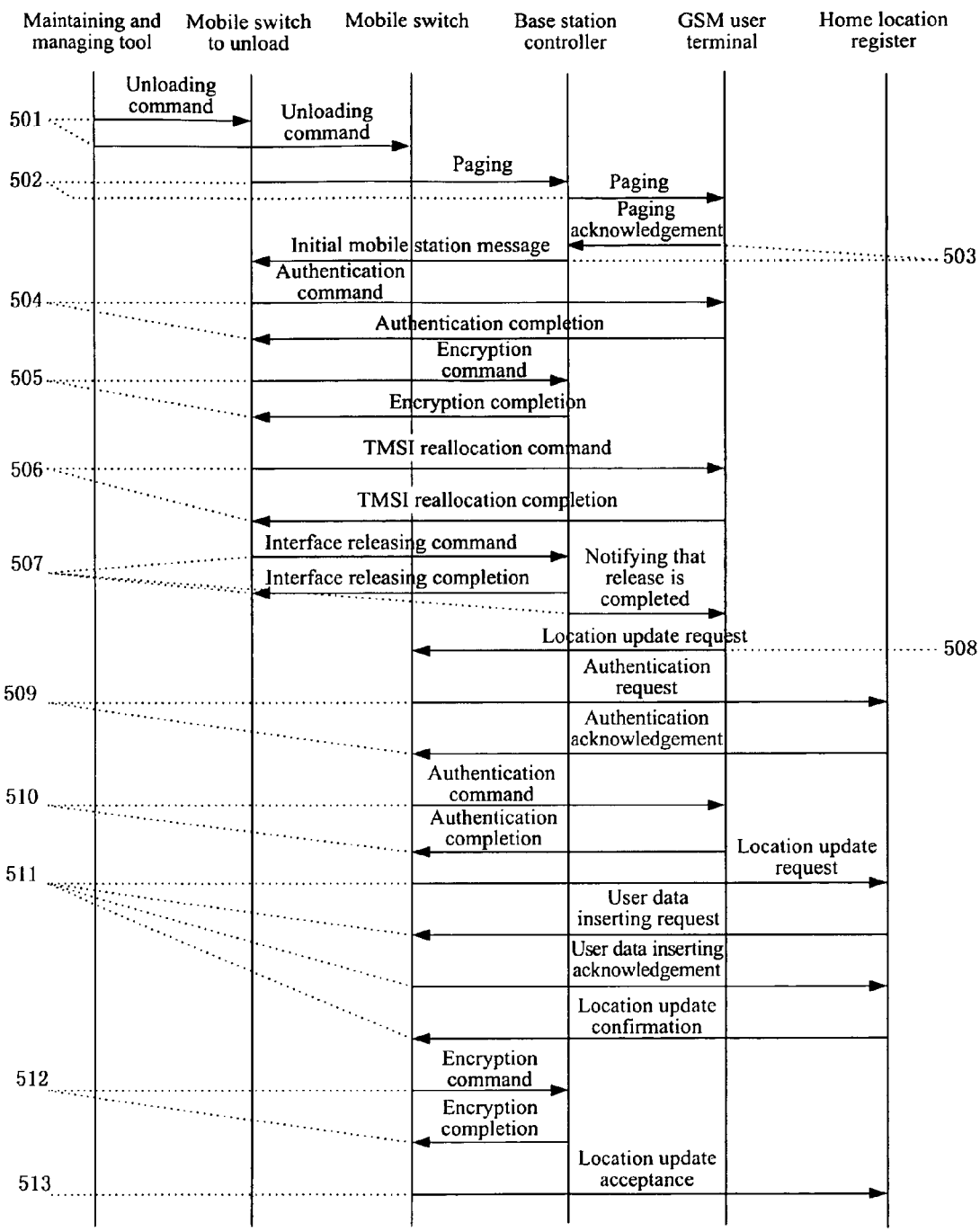
FIG. 5 is a flow of quickly unloading a GSM user terminal according to one example of the present invention.

As shown in FIG. 5, it is a flow of quickly unloading a GSM user terminal according to one example of the present invention. It can be seen from the flow that after receiving a command of unloading a user terminal, a mobile switch to unload originates a paging for a GSM user terminal registered under the mobile switch, allocates a new TMSI for the user terminal after paging, fills the Non-Broadcast LAI in a TMSI reallocation message, and the mobile switch to unload requires the user terminal to re-originate location update immediately. Since the newly allocated TMSI includes a Null-NRI, the user terminal is allocated into other mobile switches that are not in unloading condition in the process of location update. The specific steps of the above flow are as follows:

501, starting the unloading process, a maintaining and managing tool sending a unloading command to a mobile switch to unload, notifying all base station controllers in the switch pool that the mobile switch starts unloading;

Step 502, the mobile switch to unload sending a paging message to the base station controller, and paging all GSM user terminals registered under this mobile switch through the base station controller;

In this example, paging messages can be sent in batches for a plurality of times during an unloading process of the mobile switch to unload according to load capability of the mobile switch to unload and a signaling link.

Step 503, a GSM user terminal acknowledging the paging, a paging acknowledgement being packed as an initial mobile station message in the base station controller and sent to the mobile switch to unload;

In this example, if the GSM user terminal does not acknowledge the paging, then the mobile switch to unload may send a searching command in all wireless areas in the switch pool, and the user terminal returns a paging acknowledgement after receiving the searching command.

S504, the mobile switch to unload performing authentication for the GSM user terminal by sending an authentication command to the GSM user terminal, which returning an authentication acknowledgement.

Step 505, the mobile switch to unload continues to perform encryption, and sending an encryption command to the base station controller, the base station controller performing wireless side encryption and returning an encryption completion message;

Step 506, the mobile switch to unload sending a TMSI reallocation command to the GSM user terminal, wherein the command carries TMSI and LAI. The NRI included in the TMSI is Null-NRI, and the LAI is Non-Broadcast LAI. The GSM user terminal returning a TMSI reallocation completion message;

Step 507, the mobile switch to unload sending an interface releasing command to the base station controller to release the current signaling connection. The base station controller releasing the signaling connection to the GSM user terminal and returning an interface release completion message; the base station controller also notifying the GSM user terminal that the signaling connection has been released;

Step 508, after receiving a TMSI reallocation message, the GSM user terminal originating location update after the current signaling connection is released since LAI is Non-Broadcast LAI, and sending a location update request to the base station controller, wherein the request carries the above TMSI. After the base station controller receives the location update request, the base station controller allocating the location update request to other mobile switches that are not in unloading condition for processing since NRI is Null-NRI;

Step 509, the mobile switch that has received location update processing the location update request. Since the GSM user terminal is registered at the mobile switch for the first time, the mobile switch sending an authentication request to a home location register, and the home location register returning authentication information of the user in an authentication acknowledgement message;

Step 510, the mobile switch performing authentication for the GSM user terminal by sending an authentication command to the GSM user terminal, which returning an authentication completion message;

Step 511, the mobile switch sending a location update request to the home location register, the home location register downloading user data and sending a user data inserting request. The mobile switch storing the user data and returning a user data inserting acknowledgement, and the home location register returning a location update confirmation;

Step 512, the mobile switch sending an encryption command to the base station controller, and the base station controller performing wireless encryption and returning an encryption completion message;

Step 513, the mobile switch sending a location update acceptance to the GSM user terminal, wherein the TMSI field includes NRI of the mobile switch. At this moment, the user terminal is transferred to a new mobile switch. When all GSM user terminals under the mobile switch to unload are transferred, the process of unloading by a mobile switch is completed.

In the above example, after a mobile switch to unload receives a command of unloading a user terminal, it actively pages the user terminal registered under the mobile switch to unload through wireless access nodes, thus shortening the time for information communication with the user terminal, hence shortening the unloading time of a mobile switch, thus quickening progress of maintenance and protecting QoS of the network.

Figure 6:
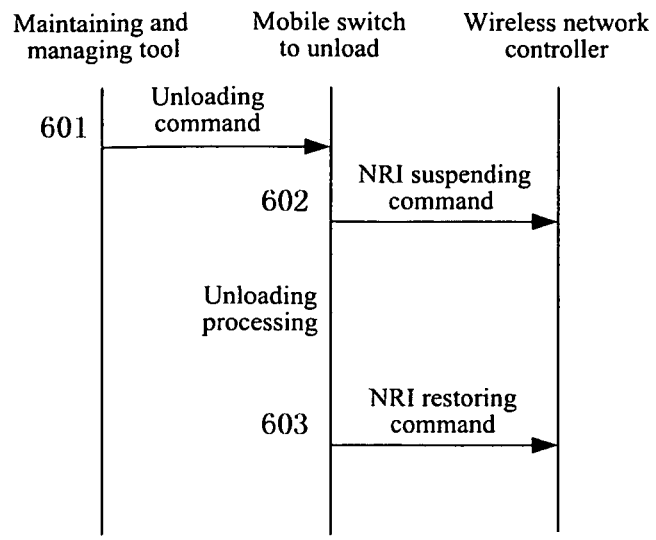
FIG. 6 is a flow for a mobile switch to notify a wireless network controller to suspend or restore NRI according to one example of the present invention.
Figure 7:
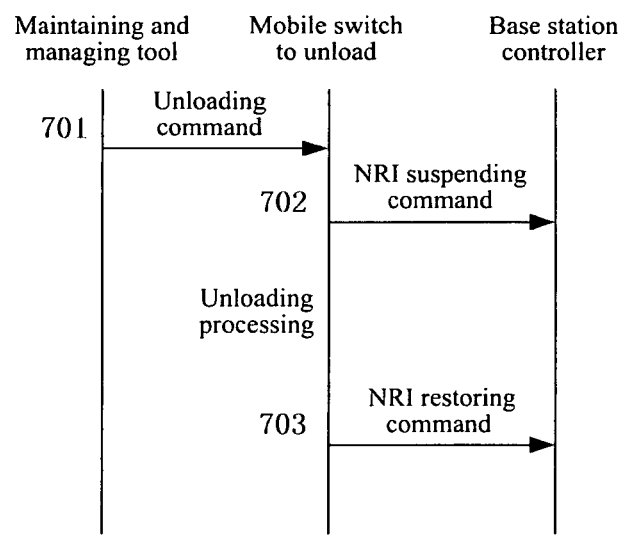
FIG. 7 is a flow for a mobile switch to notify a base station controller to suspend or restore NRI according to one example of the present invention.

It can be seen from FIGS. 6 and 7 that after the unloading process is started, the mobile switch sends a NRI suspending message to the wireless access nodes. Referring to FIG. 6, after the mobile switch receives a command of unloading a user terminal, it sends a NRI suspending command to a wireless network controller. After maintenance is completed, a NRI restoring command is sent to the wireless network controller. The specific steps are as follows:

Step 601, a maintaining and managing tool issuing an unloading command to a target mobile switch;

The above target mobile switch is just the mobile switch to unload that needs to unload a user terminal.

Step 602, the mobile switch to unload sending a NRI suspending command to all wireless network controllers controlled by the mobile switch;

Step 603, after maintenance of the mobile switch to unload is completed, the mobile switch starting work again, and sending a NRI restoring command to all wireless network controllers controlled by the mobile switch in the switch pool.

The formats of NRI suspending and NRI restoring commands will be introduced respectively.

(1) the format of the NRI suspending command is as shown in the following table:

| name of the message field | type | length |
| --- | --- | --- |
| Message Type | required | 1 byte |
| TMSI List | required | 6 × n, n is the length of the list | a wireless network controller extracts NRI from TMSI (2) the format of the NRI restoring command is as shown in the following table:

| name of the message field | type | length |
| --- | --- | --- |
| Message Type | required | 1 byte |
| TMSI List | required | 6 × n, n is the length of the list | a wireless network controller extracts NRI from TMSI

Similarly, if the wireless network controller is changed to a base station controller, the above example also applies to a GSM user terminal.

Referring to FIG. 7, after a mobile switch receives a command of unloading a user terminal, it sends a NRI suspending command to a base station controller. After maintenance is completed, a NRI restoring command is sent to the base station controller. The specific steps are as follows:

Step 701, a maintaining and managing tool issuing an unloading command to a target mobile switch;

Step 702, the mobile witch to unload sending a NRI suspending command to all base station controllers controlled by the mobile switch;

Step 703, after maintenance of the mobile switch to unload is completed, the mobile switch starting work again, and sending a NRI restoring command to all base station controllers controlled by the mobile switch in the switch pool.

The formats of NRI suspending and NRI restoring commands will be introduced respectively.

(1) the format of the NRI suspending command is as shown in the following table:

| name of the message field | type | length |
| --- | --- | --- |
| Message Type | required | 1 byte |
| TMSI List | required | 6 × n, n is the length of the list | a wireless network controller extracts NRI from TMSI (2) the format of the NRI restoring command is as shown in the following table:

| name of the message field | type | length |
| --- | --- | --- |
| Message Type | required | 1 byte |
| TMSI List | required | 6 × n, n is the length of the list | a wireless network controller extracts NRI from TMSI

In the example of the present invention, if, a user terminal is not paged in the process of unloading the user terminal because it has been powered off, an initial user equipment message or an initial mobile station message may be originated after it is powered on, wherein the TMSI field includes NRI of the mobile switch to unload; since the NRI has been suspended by the mobile switch to unload, wireless access nodes allocate the message to other mobile switches that are not in unloading condition in the switch pool. The above flow will be introduced based on a WCDMA user terminal and a GSM user terminal respectively.

Figure 8:
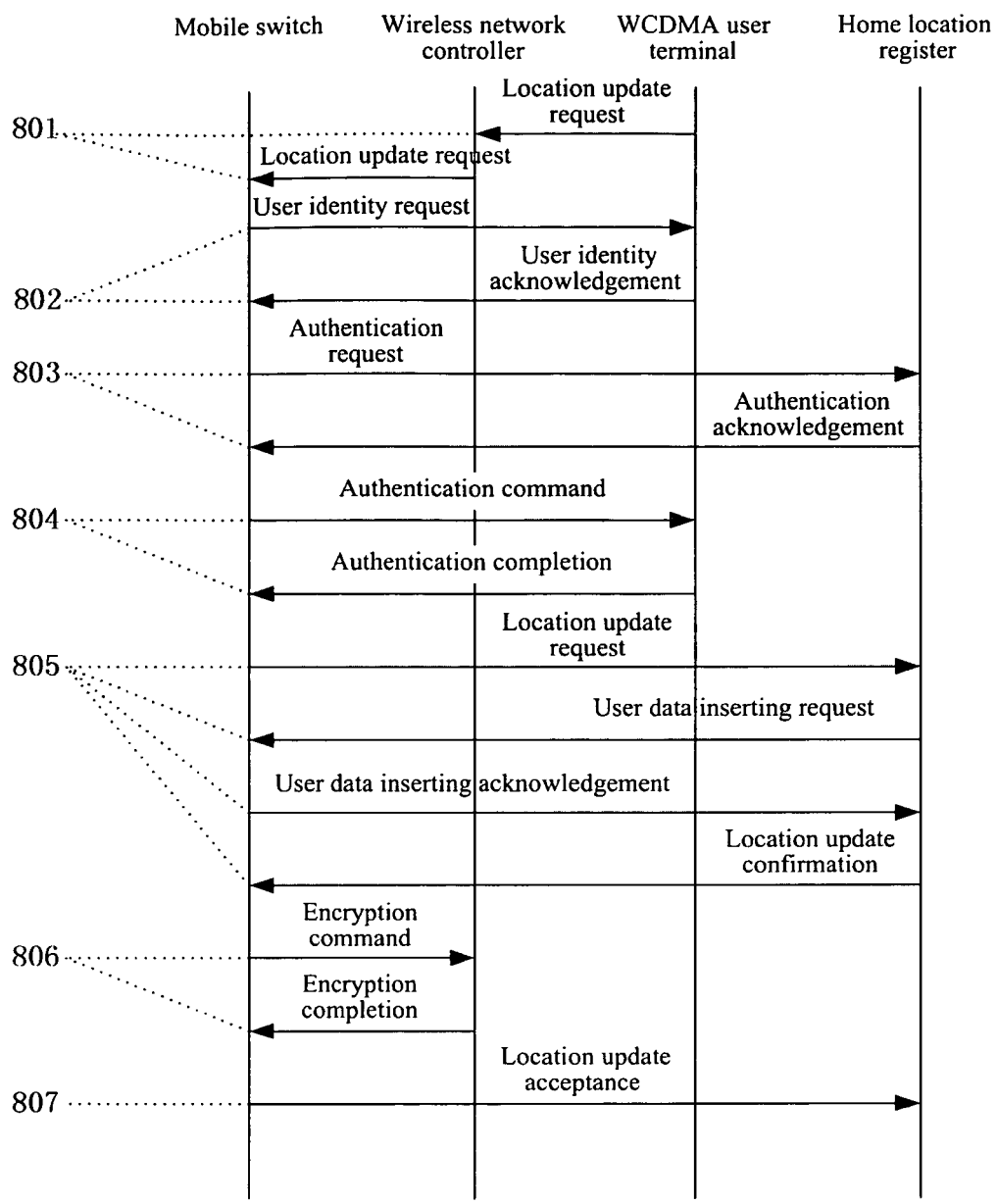
FIG. 8 is a flow of location updating after a powered-off WCDMA user terminal is powered on once again according to one example of the present invention.

As shown in FIG. 8, it is a flow of location updating after a powered-off WCDMA user terminal is powered on once again according to one example of the present invention. It can be seen from this figure that when the mobile switch to unload performs unloading, if the WCDMA user terminal registered under the mobile switch is powered off, then the WCDMA user terminal cannot receive the paging command, and hence cannot be transferred to other mobile switches. Therefore, after the WCDMA user terminal is powered on, the wireless network controller needs to judge the TMSI of the location update message, and if the TMSI carries the NRI suspended by the mobile switch to unload, then the location update request is forwarded to other mobile switches that are not in unloading conditions in the switch pool. The specific steps of the above flow are as follows:

Step 801, after the WCDMA user terminal is powered on, it sending an initial user equipment message (which includes a location update request) to a wireless network controller, wherein the message carries a TMSI allocated before the user terminal is powered off. Since the TMSI is allocated by the original mobile switch to unload, it includes the NRI of the mobile switch to unload. When the wireless network controller receives the message, it detects that the NRI of the TMSI belongs to the NRI list that is required by the mobile switch to unload to be suspended, so the location update request is forwarded to other mobile switches that are not in unloading conditions in the switch pool;

Step 802, the mobile switch receiving the location update command finding that the TMSI is not allocated by the present mobile switch, sending a user identity request to the user terminal to ask for an IMSI. The user terminal returning a acknowledgement message which carries the IMSI of the user terminal;

Step 803, the mobile switch obtaining the authentication parameters of the WCDMA user terminal from a home location register, and sending an authentication request to the home location register, and the home location register returning an authentication acknowledgement;

Step 804, the mobile switch performing authentication for the WCDMA user terminal by sending an authentication command to the user terminal, which returning an authentication completion message;

Step 805, the mobile switch continuing to send the location update request to the home location register, the home location register inserting the user data to the mobile switch, and returning a location update acknowledgement;

Step 806, the mobile switch performing encryption, sending an encryption command to the wireless network controller. The wireless network controller performing wireless side encryption and returning an encryption completion message;

Step 807, the mobile switch sending a location update acceptance, wherein a new TMSI is allocated to the WCDMA user terminal, and the TMSI includes a NRI corresponding to the mobile switch. The subsequent WCDMA user terminals will use this TMSI to communicate with the network.

Through the above steps, a powered-off WCDMA user terminal is transferred to a new mobile switch after it is powered on once again.

Figure 9:
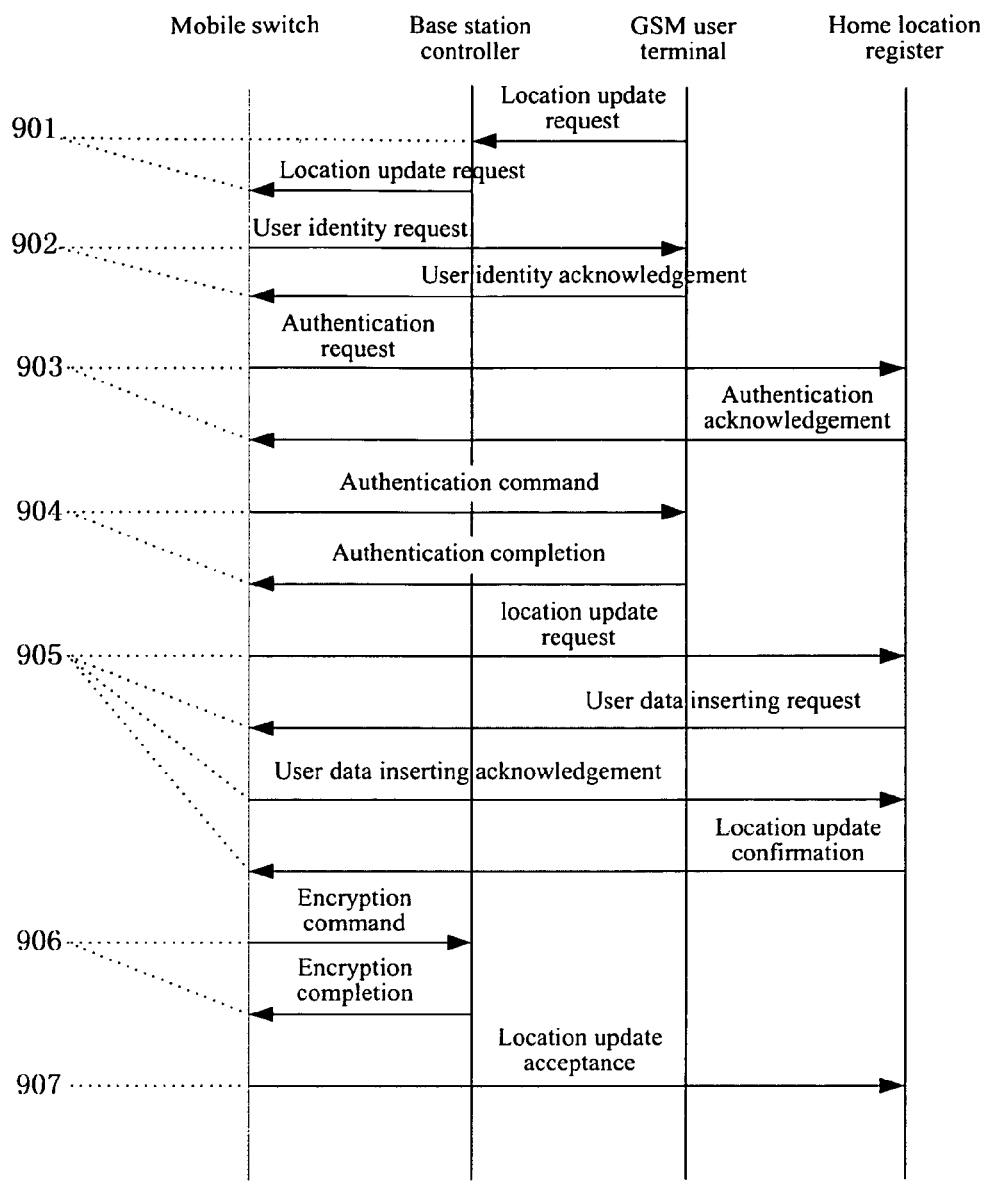
FIG. 9 is a flow of location updating after a powered-off GSM user terminal is powered on once again according to one example of the present invention.

As shown in FIG. 9, it is a flow of location updating after a powered-off GSM user terminal is powered on once again according to one example of the present invention. It can be seen from this figure that when the mobile switch to unload performs unloading, if the GSM user terminal registered under the mobile switch is powered off, then the GSM user terminal cannot receive the paging command, and hence cannot be transferred to other mobile switches. Therefore, after the GSM user terminal is powered on, the base station controller needs to judge the TMSI of the location update message, and if the TMSI carries the NRI suspended by the mobile switch to unload, then the location update request is forwarded to other mobile switches that are not in unloading conditions in the switch pool. The specific steps of the above flow are as follows:

Step 901, after the GSM user terminal is powered on, it sending an initial mobile station message (which includes a location update request) to a base station controller, wherein the message carries a TMSI allocated before the user terminal is powered off. Since the TMSI is allocated by the original mobile switch to unload, it includes the NRI of the mobile switch to unload. When the base station controller receives the message, it detects that the NRI of the TMSI belongs to the NRI list that is required by the mobile switch to unload to be suspended, so the location update request is forwarded to other mobile switches that are not in unloading conditions in the switch pool;

Step 902, the mobile switch receiving the location update command finding that the TMSI is not allocated by the present mobile switch, sending a user identity request to the user terminal to ask for an IMSI. The user terminal returning an acknowledgement message which carries the IMSI of the user terminal;

Step 903, the mobile switch obtaining the authentication parameters of the GSM user terminal from a home location register, and sending an authentication request to the home location register, and the home location register returning an authentication acknowledgement;

Step 904, the mobile switch performing authentication for the GSM user terminal by sending an authentication command to the user terminal, which returning an authentication completion message;

Step 905, the mobile switch continuing to send the location update request to the home location register, the home location register inserting the user data to the mobile switch, and returning a location update response;

Step 906, the mobile switch performing encryption by sending an encryption command to the base station controller. The base station controller performing wireless side encryption and returning an encryption completion message;

Step 907, the mobile switch sending a location update acceptance, wherein a new TMSI is allocated to the GSM user terminal, and the TMSI includes a NRI corresponding to the mobile switch. The subsequent GSM user terminals will use this TMSI to communicate with the network.

After the above steps are carried out, a GSM user terminal is transferred to a new mobile switch.

In the above example, a user under a specified mobile switch is unloaded, thus shortening the unloading time of a mobile switch, thus quickening progress of maintenance and protecting QoS of the network.

The example of the present application also provides a mobile switch in accordance with the method described in the above examples of the present invention, and it will be described below with reference to FIG. 10. Additionally, it should be pointed out that since the following examples is used to implement the above method example, the modules in the apparatus are all provided for carrying out the steps in the above method. However, the example of the present invention is not limited to the following one, and any apparatus that can carry out the above method should fall into the protection scope of the present invention.

Figure 10:
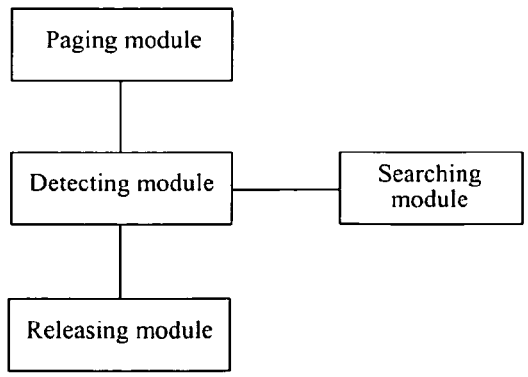
FIG. 10 is a block diagram of the structure of the mobile switch according to one example of the present invention.

As shown in FIG. 10, it is a block diagram of the structure of the mobile switch according to one example of the present invention. It can be seen from the figure that the mobile switch comprises a paging module, a detecting module and a releasing module that are sequentially connected;

The paging module is used for paging a user terminal registered under the mobile switch to unload through wireless access nodes after receiving a command of unloading a user terminal;

The detecting module is used for detecting whether a paging acknowledgement returned from the user terminal is received, if yes, sending a message to notify that the user terminal is to be unloaded; it is also used for sending a temporary mobile subscriber identity (TMSI) reallocation command including a NULL-network Resource identity to the user terminal after receiving a paging acknowledgement returned by the user terminal;

The releasing module is used for releasing a current signaling connection with the user terminal, and is also used for sending a releasing message to the wireless access nodes to release a current signaling connection with the user terminal after receiving a TMSI reallocation completion message returned from the user terminal.

In another example of the present invention, the switch further comprises a searching module connected with the detecting module, which is used for sending a command of searching the user terminal in a wireless area when the detecting module does not detect any paging acknowledgement.

In another example of the present invention, the switch further comprises a distributing module connected with the detecting module, which is used for allocating a network resource identity to the user terminal.

In another example of the present invention, the switch further comprises a suspending network resource identity module used for sending a network resource identity suspending message to the wireless access nodes.

In another example of the present invention, the switch further comprises a network resource identity restoring module used for sending a network resource identity restoring message to the wireless access nodes.

In the above example, a user under a specified mobile switch is unloaded, thus shortening the unloading time of a mobile switch, thus quickening progress of maintenance and protecting QoS of the network.

The above examples are only preferred embodiments of the present invention. It should be pointed out that a person having ordinary skill in the art can make several improvements and modifications to the present invention without departing from the principle of the present invention, and these improvements and modifications should also be construed as within the protection scope of the present invention.

INDUSTRIAL APPLICABILITY

The method of the present invention can effectively reduce duration time for a mobile switch to unload a user terminal and quicken progress of maintenance, thus protecting QoS of the network.

What we claim is:

1. A method for unloading a terminal, comprising:
a mobile switch to unload actively paging a user terminal which is registered in the mobile switch to unload through a wireless access node after receiving a command of unloading the user terminal; and
the mobile switch to unload detecting whether a paging acknowledgement returned from the user terminal is received, if yes, sending a message to notify that the user terminal is to be unloaded, and then releasing a current signaling connection with the user terminal.

2. The method according to claim 1, wherein,
after the mobile switch to unload detects that the paging acknowledgement returned from the user terminal is received, the mobile switch to unload sends a temporary mobile subscriber identity (TMSI) reallocation command including a NULL-network Resource identity to the user terminal, and after the mobile switch to unload receives a TMSI reallocation completion message returned from the user terminal, the mobile switch to unload sends a releasing message to the wireless access node to release a current signaling connection with the user terminal.

3. The method according to claim 2, further comprising:
after the mobile switch to unload detects that the paging acknowledgement returned from the user terminal is received, the mobile switch to unload notifying the user terminal that a current location area identity is a Non-Broadcast Location Area Identity;
after release of the current signaling connection is completed, the user terminal located in a non-broadcast location area originating location update, and sending a location update request to a mobile switch which is not in unloading condition for processing; and
the mobile switch which is not in unloading condition allocating a network resource identity to the user terminal.

4. The method according to claim 1, further comprising:
after the mobile switch to unload detects that the paging acknowledgement returned from the user terminal is received, the mobile switch to unload notifying the user terminal that a current location area identity is a Non-Broadcast Location Area Identity;
after release of the current signaling connection is completed, the user terminal located in a non-broadcast location area originating location update, and sending a location update request to a mobile switch which is not in unloading condition for processing; and
the mobile switch which is not in unloading condition allocating a network resource identity to the user terminal.

5. The method according to claim 1, wherein,
when paging a user terminal registered under the mobile switch to unload, the mobile switch to unload sends paging messages in batches during the unloading process according to load capability of the mobile switch to unload and/or a signaling link.

6. The method according to claim 1, further comprising:
when the mobile switch to unload does not receive a paging acknowledgement returned from the user terminal, the mobile switch to unload sending a searching command in a wireless area through the wireless access node, the user terminal returning a paging acknowledgement after receiving the searching command, and the mobile switch to unload releasing a current signaling connection with the user terminal.

7. The method according to claim 1, further comprising:
after an unloading process is started, the mobile switch to unload sending a network resource identity suspending message to the wireless access node; and
after the unloading process is over, the mobile switch to unload sending a network resource identity restoring message to the wireless access node.

8. The method according to claim 7, in a case that a paged user terminal is powered off in a process of the mobile switch to unload paging the user terminal registered under the mobile switch to unload, the method further comprising:

after the user terminal is powered on, sending an initial user terminal message or an initial mobile station message containing a network resource identity of the mobile switch to unload; and when the network resource identity is suspended, the wireless access node allocating the initial user terminal message or the initial mobile station message to other mobile switches which are not in unloading condition.

9. The method according to claim 8, wherein the wireless access node is a wireless network controller or a base station controller.

10. The method according to claim 1, wherein the wireless access node is a wireless network controller or a base station controller.

11. A mobile switch comprising a paging module, a detecting module and a releasing module which are sequentially connected, wherein,
the paging module is configured to page a user terminal registered under the mobile switch to unload after receiving a command of unloading a user terminal;
the detecting module is configured to detect whether a paging acknowledgement returned from the user terminal is received, if yes, send a message to notify that the user terminal is to be unloaded;
the releasing module is configured to release a current signaling connection with the user terminal.

12. The mobile switch according to claim 11, wherein,
the detecting module is also is configured to send a temporary mobile subscriber identity (TMSI) reallocation command including a NULL-network Resource identity to the user terminal after receiving a paging acknowledgement returned from the user terminal;
the releasing module is also is configured to send a releasing message to the wireless access node to release a current signaling connection with the user terminal after receiving a TMSI reallocation completion message returned from the user terminal.

13. The mobile switch according to claim 11, further comprising a searching module connected with the detecting module, wherein,
the searching module is configured to send a command of searching the user terminal in a wireless area when the detecting module does not detect any paging acknowledgement.

14. The mobile switch according to claim 11, further comprising an allocating module, wherein,
the allocating module is configured to allocate a network resource identity to the user terminal.

15. The mobile switch according to claim 11, further comprising a network resource identity suspending module and a network resource identity restoring module;
the network resource identity suspending module is configured to send a network resource identity suspending message to the wireless access node after an unloading process is started;
the network resource identity restoring module is configured to send a network resource identity restoring message to the wireless access node after an unloading process is over.

* * * * *